(12) United States Patent
Yamamoto

(10) Patent No.: US 6,637,726 B1
(45) Date of Patent: Oct. 28, 2003

(54) VALVE CORE

(75) Inventor: Masahiko Yamamoto, Gifu (JP)

(73) Assignee: Pacific Industrial Co., Ltd., Gifu (JP)

( * ) Notice: Subject to any disclaimer, the term of this patent is extended or adjusted under 35 U.S.C. 154(b) by 0 days.

(21) Appl. No.: 10/339,976

(22) Filed: Jan. 10, 2003

(30) Foreign Application Priority Data

Aug. 7, 2002 (JP) ....................... 2002-230251

(51) Int. Cl.[7] ............................... F16K 1/46
(52) U.S. Cl. .................. 251/152; 62/292; 251/149.1
(58) Field of Search ................ 251/142–156; 62/292

(56) References Cited

U.S. PATENT DOCUMENTS

| | | | | |
|---|---|---|---|---|
| 4,378,028 A | * | 3/1983 | Weber et al. | 251/149.6 |
| 5,390,898 A | * | 2/1995 | Smedley et al. | 251/149.6 |
| 6,273,397 B1 | * | 8/2001 | Schultz et al. | 251/149.6 |
| 6,296,228 B1 | * | 10/2001 | Knowles et al. | 251/149.1 |
| 6,382,589 B1 | * | 5/2002 | Edstrom, Sr. et al. | 251/149.6 |

FOREIGN PATENT DOCUMENTS

| | | |
|---|---|---|
| JP | 11-348516 A | 12/1999 |
| JP | 2002-340206 A | 11/2002 |
| JP | 2003-28329 A | 1/2003 |

* cited by examiner

Primary Examiner—Paul J. Hirsch
(74) Attorney, Agent, or Firm—Akin Gump Strauss Hauer & Feld, L.L.P.

(57) ABSTRACT

A valve core includes a generally cylindrical core body fixed in a core mounting hole formed in a counterpart member, the core body having an open end, a moving shaft extending through the core body so as to be directly driven, the shaft having an end, a pair of flanges formed on the end of the shaft, a generally annular sealing member held between the flanges so as to adhere closely to an inner circumferential edge of the open end of the core body or an inner circumferential face of the core mounting hole to close the core mounting hole, and a pair of engagement portions formed in either flange and the sealing member so as to be brought into a concavo-convex engagement with each other to limit deformation of the sealing member causing an increase in its diameter.

12 Claims, 8 Drawing Sheets

VALVE CORE

BACKGROUND OF THE INVENTION

1. Field of the Invention

This invention relates to a valve core which is mounted in a core mounting hole formed in a counterpart member to open and close the core mounting hole.

2. Description of the Related Art

A conventional valve core comprises a cylindrical core body fixed in a core mounting hole formed in a counterpart member on which the valve core is to be mounted. A moving shaft extends through the core body so as to be directly driven. The moving shaft has one end on which a pair of flanges are provided. A sealing member is held between the flanges. The sealing member is caused to adhere closely to an inner circumferential edge of an opening of the core body so as to close the core mounting hole. In the above-described conventional valve core, however, the sealing member held between the flanges sometimes drops off.

SUMMARY OF THE INVENTION

Therefore, an object of the present invention is to provide a valve core which can prevent the sealing member from dropping off from between the flanges.

The present invention provides a valve core comprising a generally cylindrical core body fixed in a core mounting hole formed in a counterpart member, the core body having an open end, a moving shaft extending through the core body so as to be directly driven, the shaft having an end, a pair of flanges provided on the end of the shaft, a generally annular sealing member held between the flanges so as to adhere closely to an inner circumferential edge of the open end of the core body or an inner circumferential face of the core mounting hole to thereby close the core mounting hole, and a pair of engagement portions formed in either flange and the sealing member so as to be brought into a concavo-convex engagement with each other to limit deformation of the sealing member causing an increase in a diameter thereof.

In the above-described valve core, the sealing member is held between the paired flanges, and the engagement portions are brought into concavo-convex engagement with each other between the flange and the sealing member, whereby deformation of the sealing member causing spread of the diameter thereof is limited. Accordingly, even where adhering closely to the inner circumferential edge of the open end of the core body or the Inner circumferential face of the core mounting hole, the sealing member is moved during fixation at the flange side when the valve core is opened. Consequently, the sealing member can be prevented from dropping off from between the flanges although it sometimes drops off in the conventional valve cores.

More specifically, either one of the engagement portions is preferably a protrusion protruding from the flange and biting into the sealing member. In this construction, the protrusion pushes the sealing member such that a part of the sealing member is depressed. The protrusion and the depression are brought into concavo-convex engagement.

Further, the engagement portions preferably include a protrusion formed by protruding a part of the sealing member toward one of the flanges and a depression formed by depressing a part of said one flange so as to correspond to the protrusion. Further, one of the flanges located farther away from the core body than the other preferably includes a butting portion protruding from said flange toward the sealing member, and a portion of said flange located outside the butting portion is opposed to the sealing member with a space defined therebetween. Consequently, a deformed part of the sealing member is located in the space thereby to be protected.

Additionally, the inner circumferential edge of the open end of the core body is preferably formed with an inner inclined face gradually spread toward a distal end thereof, the sealing member being caused to adhere closely to the inner inclined face, and the flange has an outer circumferential face on which an outer inclined face is formed so as to abut against the inner inclined face. In this construction, the outer inclined face formed on the outer circumferential face of one of the flanges is caused to abut against the inner inclined face of the core body, whereby the flange is aligned and axially positioned. The sealing performance of the valve core and be improved since the sealing member adheres closely to the inner inclined face in the aligned and positioned state of the flange.

BRIEF DESCRIPTION OF THE DRAWINGS

Other objects, features and advantages of the present invention will become clear upon reviewing the following description of embodiments, made with reference to the accompanying drawings, in which.

DETAILED DESCRIPTION OF THE INVENTION

Figure 1:
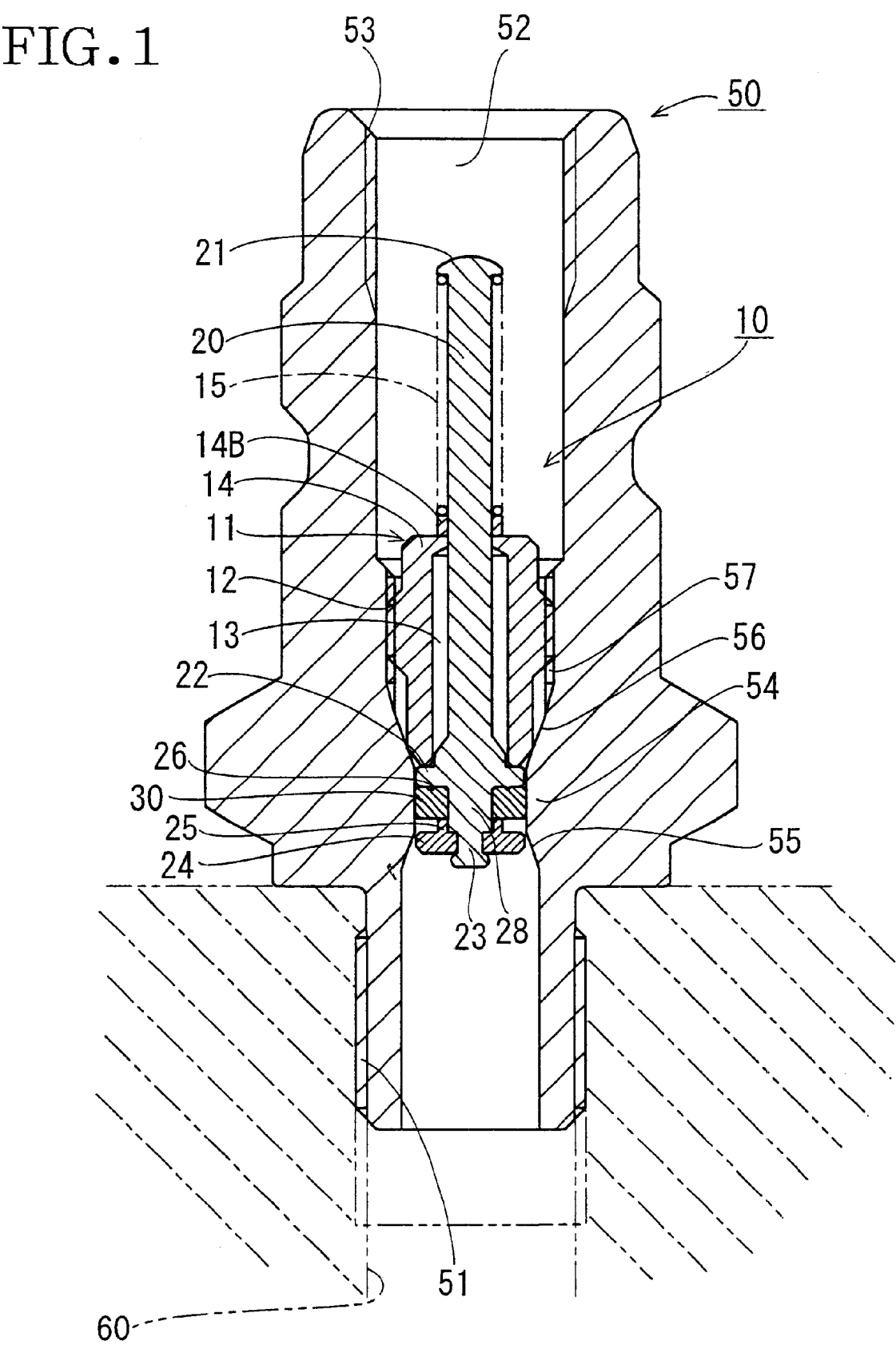
FIG. 1 is a longitudinal side section of the valve core of a first embodiment in accordance with the invention.

A first embodiment of the invention will be described with reference to FIGS. 1 to 6. Referring to FIG. 1, reference numeral 50 designates a nozzle serving as a counterpart member in the present invention and provided for charging a car air-conditioner (not shown) with a refrigerant. The nozzle 50 has a proximal end formed with a male thread 51 which is brought into thread engagement with a suitable component of the air-conditioner (not shown) so that a core mounting hole 52 provided in the nozzle 50 communicates with a refrigerant flow path 60 formed in the component of the air-conditioner. The refrigerant fed from the charge opening 53 of the nozzle 50 is charged through the core mounting hole 52 into the refrigerant flow path 60.

The nozzle 50 has a seal sliding portion 54 formed in the middle of the core mounting hole 52. The sliding portion 54 has a smaller inner diameter than the other portion of the core mounting hole 52. The inner circumferential face of the core mounting hole 52 includes two inclined faces 55 and 56 formed in the front and rear of the seal sliding portion 54 respectively. Each inclined face has an inner diameter gradually increased as it goes farther away from the seal sliding portion 54. The inner circumferential face of the core mounting hole 52, is further formed with a female thread 57 located at the charge opening 53 side relative to the seal sliding portion 54 and inclined faces 55 and 56. The valve core 10 in accordance with the invention is brought into thread engagement with the female thread 57.

The valve core 10 includes a cylindrical core body 11 having an insertion hole 13 formed inside the same. A moving shaft 20 extends through the insertion hole 13. The core body 11 is tapered toward its distal end or lower end as viewed in FIG. 1 and has a male thread 12 formed on an outer circumferential face of a proximal end side thereof. The valve core 10 is inserted, from its distal end side, into the charge opening 53 of the nozzle 50, and the male thread 12 is brought into thread engagement with the female thread 57 so that the valve core 10 is fixed in the mounting hole 52. Further, the distal end of the core body 11 is abutted against the inclined face 56 of the core mounting hole 52 so that the valve core 10 is axially positioned with respect to the core mounting hole 52.

Figure 2:
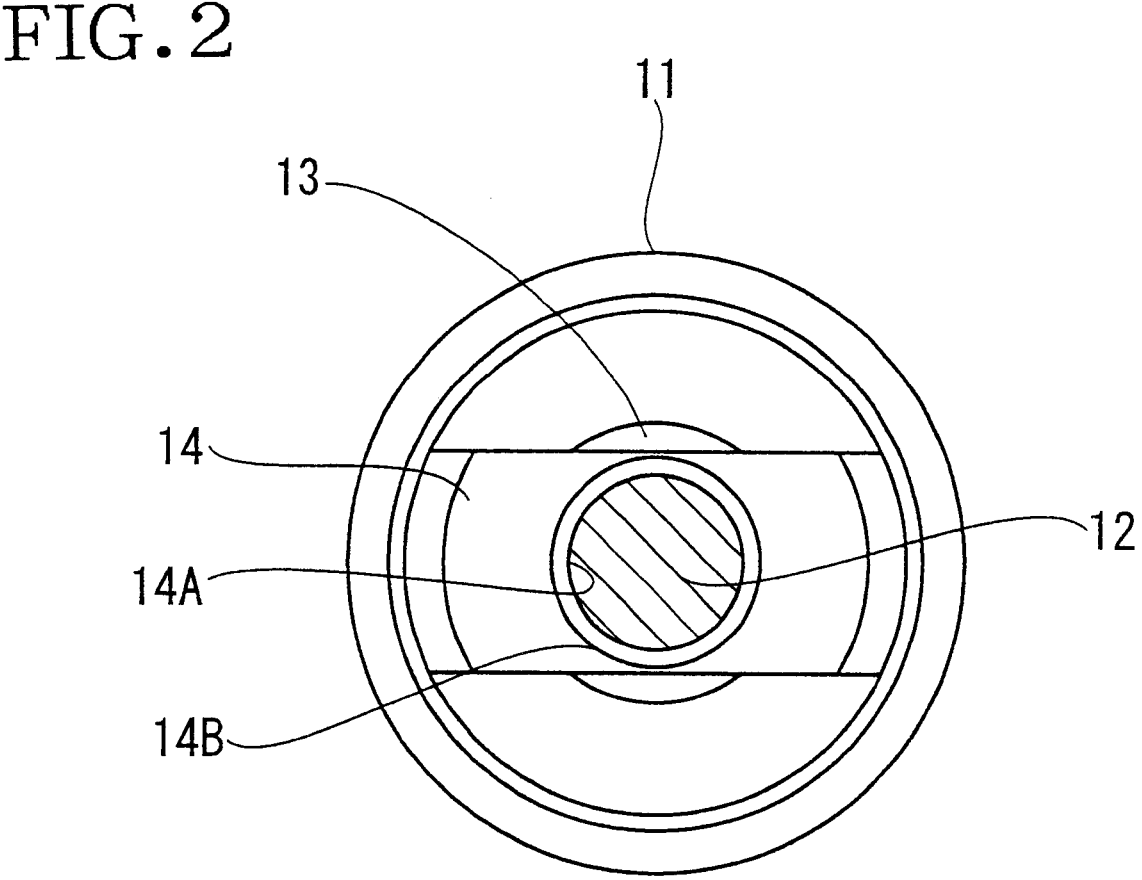
FIG. 2 is a plan view of the valve core.
Figure 3:
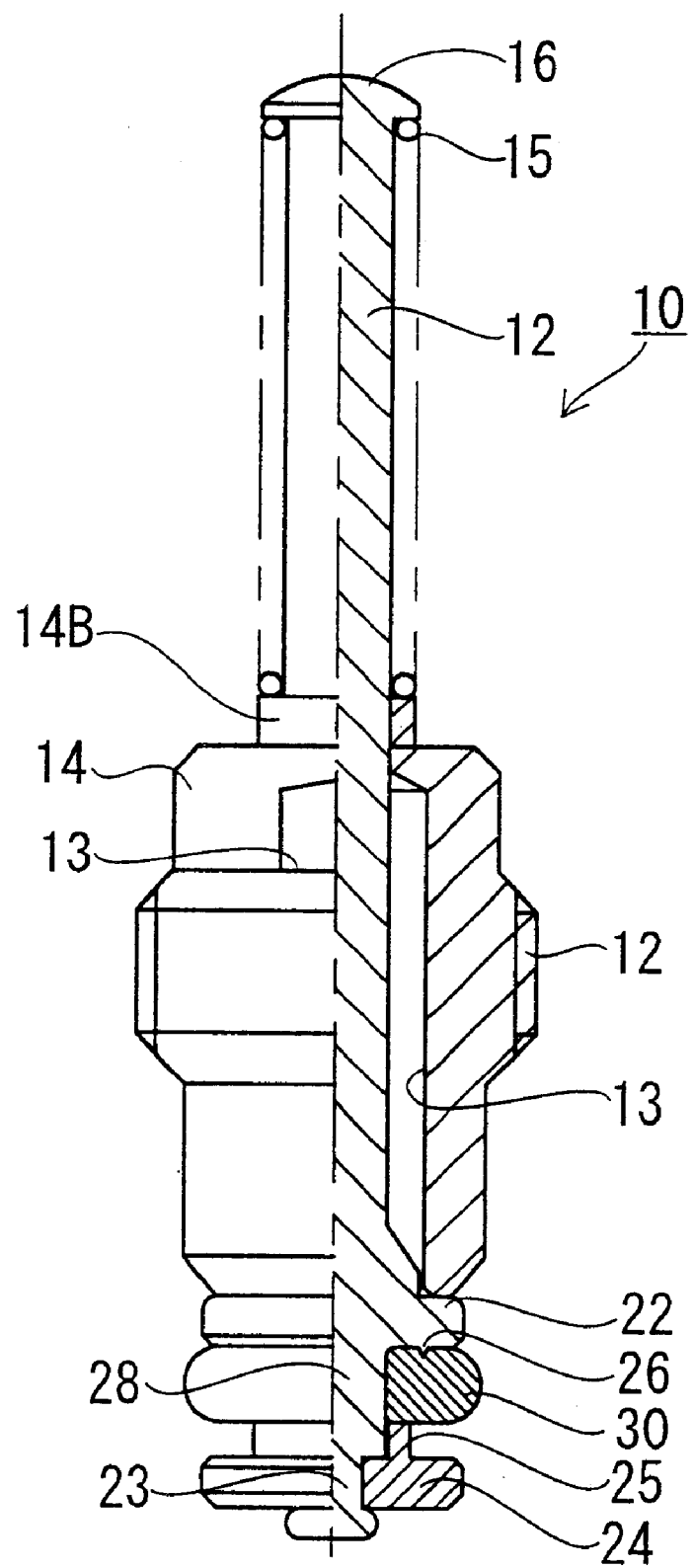
FIG. 3 is a partially sectional side view of the valve core.

A bridging portion 14 is formed on the proximal end of the core body 11 so as to extend across an open end of the insertion hole 13 as shown in FIGS. 2 and 3. The open end of the insertion hole 13 across which the bridging portion 14 extends communicates with the core mounting hole 52 as well as with the insertion hole 13, so that an overall space between the inner circumferential face of the insertion hole 13 and the shaft 20 is open to an atmosphere outside the nozzle 50. The bridging portion 14 has a shaft support hole 14A formed so as to be generally concentric with the insertion hole 13 as shown in FIG. 2. The shaft 20 extends through the shaft support hole 14A. A sleeve 14B and a compression coil spring 15 are provided around a portion of the shaft 20 protruding out of the shaft support hole 14A. The sleeve 14B and the coil spring 15 are held between a head 21 formed on an upper end of the shaft 20 by means of caulking and an upper face of the bridging portion 14 as viewed in FIG. 3. Spring force of the coil spring 15 urges the shaft 20 in one direction relative to the core body 11.

Figure 4:
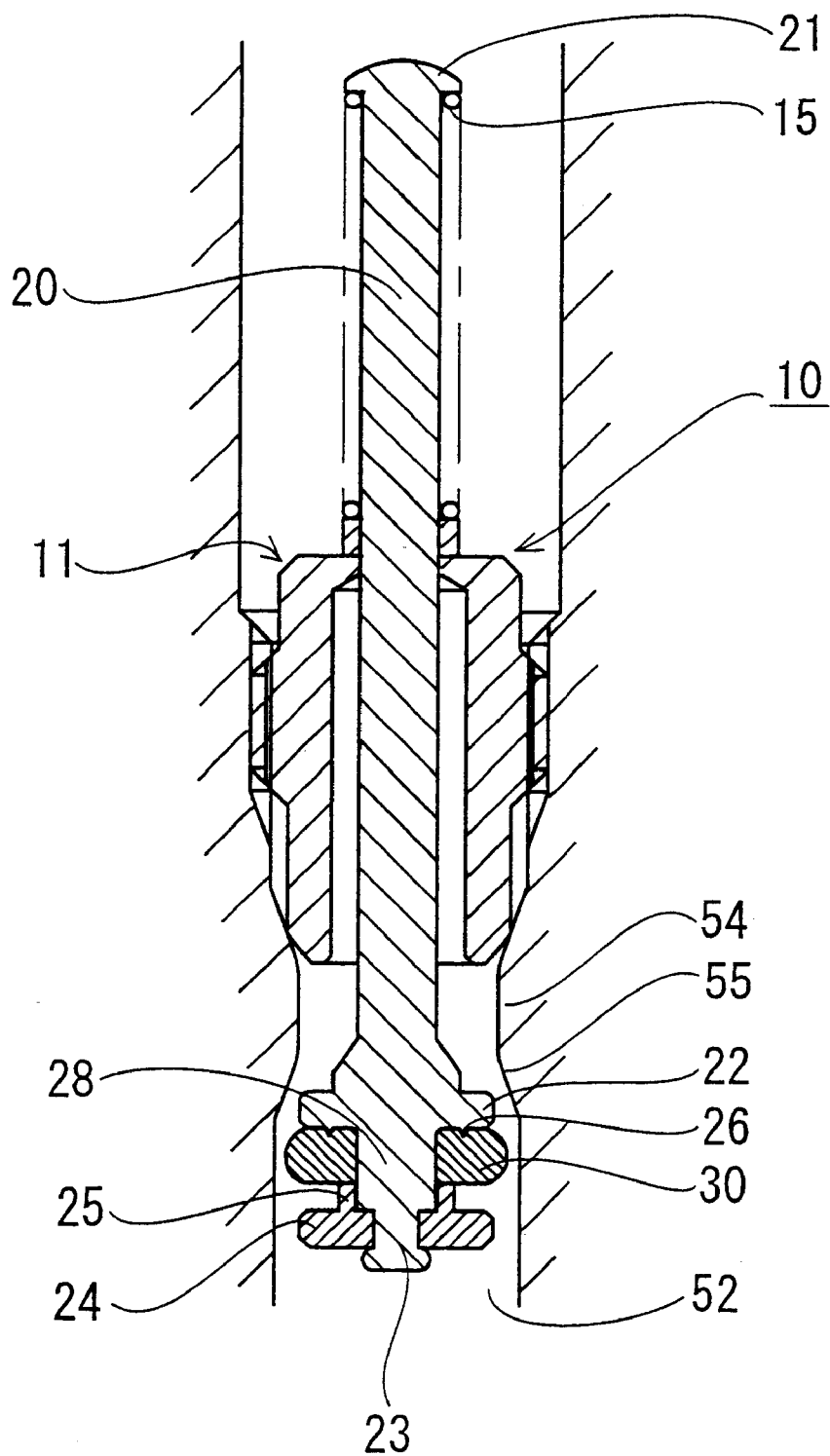
FIG. 4 is a longitudinal side section of the valve core in an open state.

The shaft 20 includes a first flange 22 formed integrally on the end thereof opposed to the head 21 or lower end of the shaft 20 as viewed in FIG. 3. The first flange 22 is abutted against the distal end face of the core body 11 such that the shaft 20 is positioned relative to the core body 11. Further, the shaft 20 includes a portion extending downward from the first flange 22 and serving as a seal mounting portion 28 as viewed in FIG. 3. An annular sealing member 30 is fitted with the seal mounting portion 28. The sealing member 30 is a generally D-ring having flat both axial end faces and rounded outer circumferential face as shown in FIG. 4. An outer diameter of the sealing member 30 in a free state is set to be larger than an inner diameter of the seal sliding portion 54 of the core mounting hole 52 and smaller than an inner diameter of an inner portion of the core mounting hole 52.

A reduced diameter portion 23 extends from the seal mounting portion 28 with which the sealing member 30 is fitted. A generally disc-shaped second flange 24 is fitted with the reduced diameter portion 23 and thereafter, a distal end of the reduced diameter portion 23 is caulked. The second flange 24 is abutted against a stepped portion between the seal mounting portion 28 and the reduced diameter portion 23 thereby to be positioned. A generally cylindrical butting portion 25 protrudes from the second flange 24 toward the sealing member 30. The butting portion 25 has a distal end pressed against an inner edge of the sealing member 30. As a result, the sealing member 30 is held between the first flange 22 and the butting portion 25 of the second flange 24, and a portion of the second flange 24 located outside the butting portion 25 is opposed to the sealing member 30 with a space defined therebetween.

Figure 5:
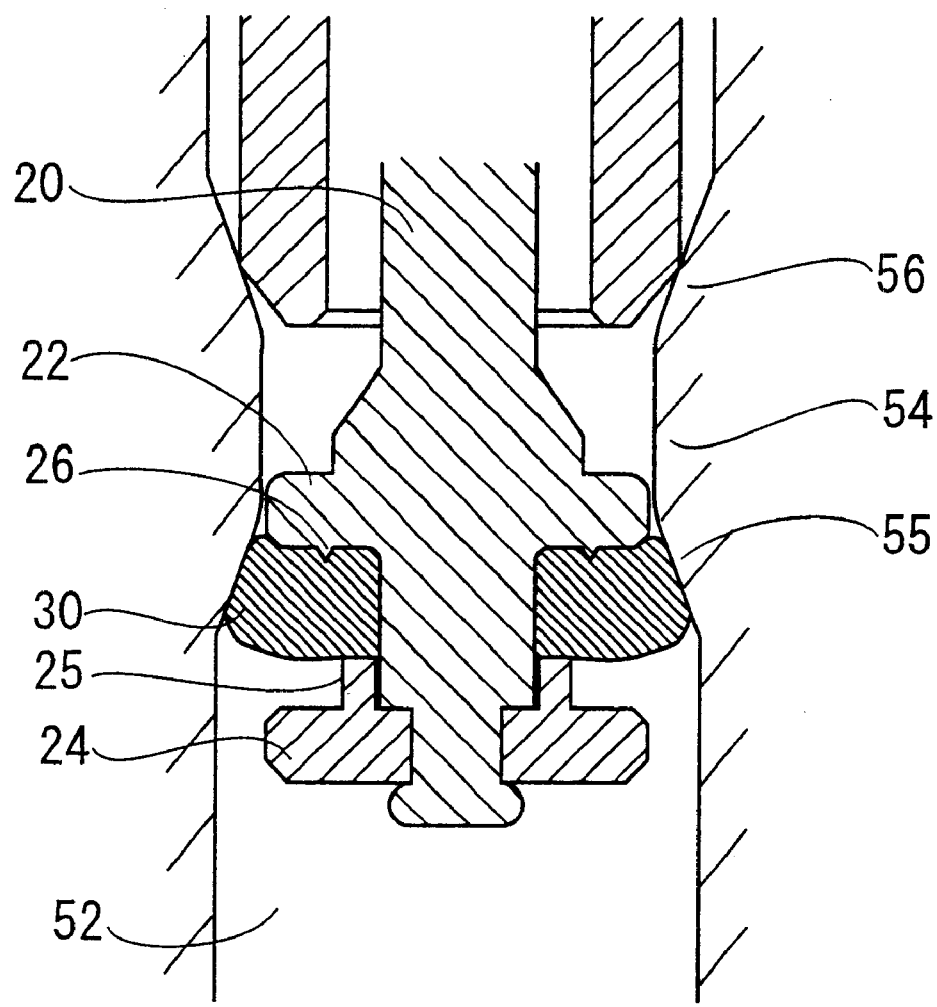
FIG. 5 is also a longitudinal side section of the valve core, showing a state where a sealing member adheres closely to an inner circumferential face of the mounting hole.
Figure 6:
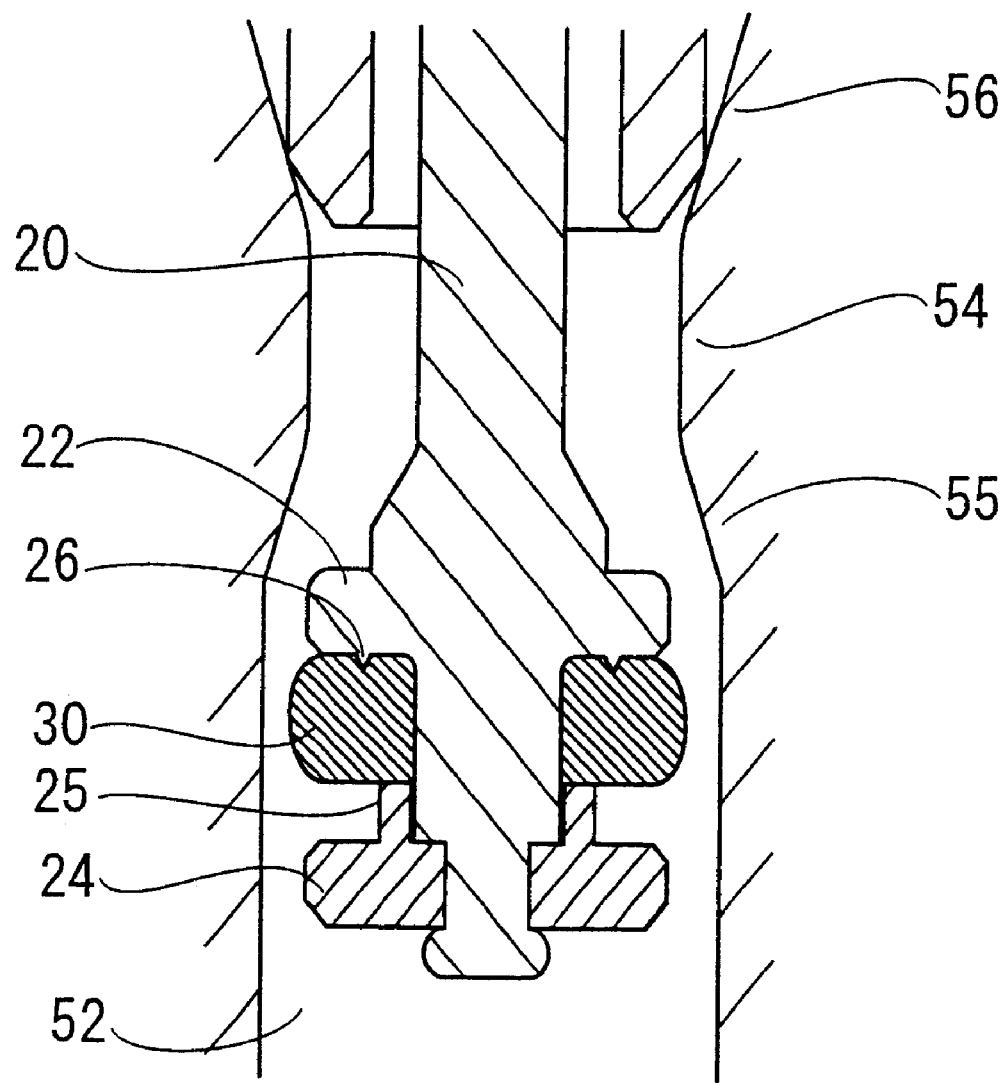
FIG. 6 is further a longitudinal side section of the valve core, showing a state where the sealing member has been released from the close adherence.

The first flange 22 includes a circumferential engagement protrusion 26 extending from the face thereof on which the sealing member 30 is laid as shown in FIGS. 5 and 6. The engagement protrusion 26 is tapered toward the sealing member 30 and formed over the overall circumference of the first flange 22. The engagement protrusion 26 bites into the sealing member 30 when the sealing member 30 is pressed by the second flange 24 against the first flange 22. The engagement protrusion 26 is maintained in the biting state.

The operation of the valve core will now be described. The valve core 10 is usually closed by means of the pressure of the refrigerant in the refrigerant path 60 or the urging force of the coil spring 15 as shown in FIG. 1. More specifically, the first flange 22 is in abutment with the distal end of the core body 11 thereby to be positioned. The sealing member 30 is adherent closely to the inner circumferential face of the seal sliding portion 54. As a result, the core mounting hole 52 is closed by the valve core 10.

The sealing member 30 is deformed when adhering closely to the seal sliding portion 54, although the outer circumferential face of the sealing member 30 is rounded in the free state. An amount of deformation is received by the space defined between the sealing member 30 and the portion of the second flange 24 located outside the butting portion 25. Accordingly, for example, even when foreign matter comes near from the refrigerant flow path 60 side, the sealing member 30 is protected by the second flange 24.

When the valve core 10 is to be opened, a suitable tool is inserted into the charge opening 53 of the core mounting hole. 52 so that the shaft 20 is moved. Alternatively, a gas having a pressure larger than a sum of an internal pressure in the refrigerant path 60 and the urging force of the coil, spring 15. Consequently, the sealing member 30 is moved inward relative to the seal sliding portion 54 of the core mounting hole 52. Then, a space is defined between the sealing member 30 and the inner circumferential face of the core mounting hole 52 as shown in FIG. 4, whereupon the gas can flow through the core mounting hole 52.

On the other hand, the sealing member 30 sometimes adheres closely to the inner circumferential face of the seal sliding portion 54 when the valve core 10 is to be closed. In this case, when moved inward relative to the seal sliding portion 54, the sealing member 30 adherent closely to the seal sliding portion 54 is pulled in such a direction that the diameter of the sealing member 30 is increased, as shown in FIG. 5. In the embodiment, however, the engagement protrusion 26 of the first flange 22 bites into the sealing member 30 into the concavo-convex engagement with the latter, thereby limiting deformation of the sealing member resulting in an increase in its diameter. Consequently, the sealing member 30 can be prevented from dropping off from between the flanges 22 and 24.

In the valve core 10 of the embodiment, the engagement protrusion 26 of the first flange 22 bites into the sealing member 30 into the concavo-convex engagement with the latter. Accordingly, the sealing member 30 can be prevented from dropping off from between the flanges 22 and 24. Consequently, the core mounting hole 52 can reliably be opened and closed even when the sealing member 30 is pressed by a high pressure gas such as a refrigerant fluid in an air conditioner thereby to adhere closely to the counterpart member.

Figure 7:
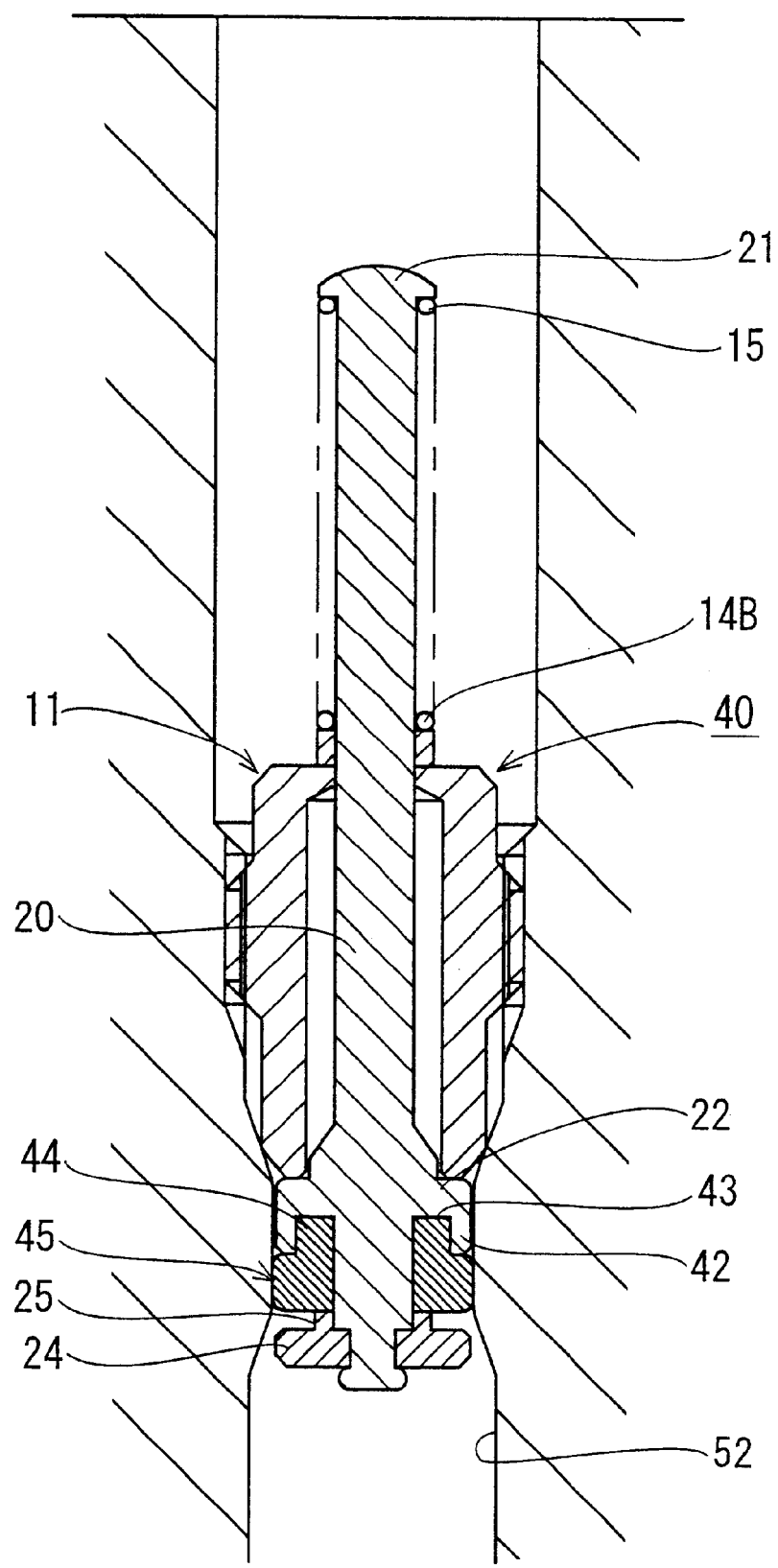
FIG. 7 is a longitudinal side section of the valve core of a second embodiment in accordance with the invention.

FIG. 7 illustrates a valve core 40 of a second embodiment in accordance with the invention. The valve core 40 differs from the valve core 10 of the foregoing embodiment in the structure of the first flange and sealing member. Only the difference between the first and second embodiments will be described. Identical or similar parts in the second embodiment are labeled by the same reference symbols as those in the first embodiment. Accordingly, the description of these parts will be eliminated.

The first flange 22 of the shaft 20 in the valve core 40 includes an outer cylindrical wall 42 protruding from an outer edge thereof toward the sealing member 45. The first flange 22 has an annular depression 43 formed by depressing an inner edge thereof. The sealing member 45 has a cylindrical protrusion 44 brought into concavo-convex engagement with the depression 43. The second embodiment can achieve the same effect as the first embodiment.

Figure 8:
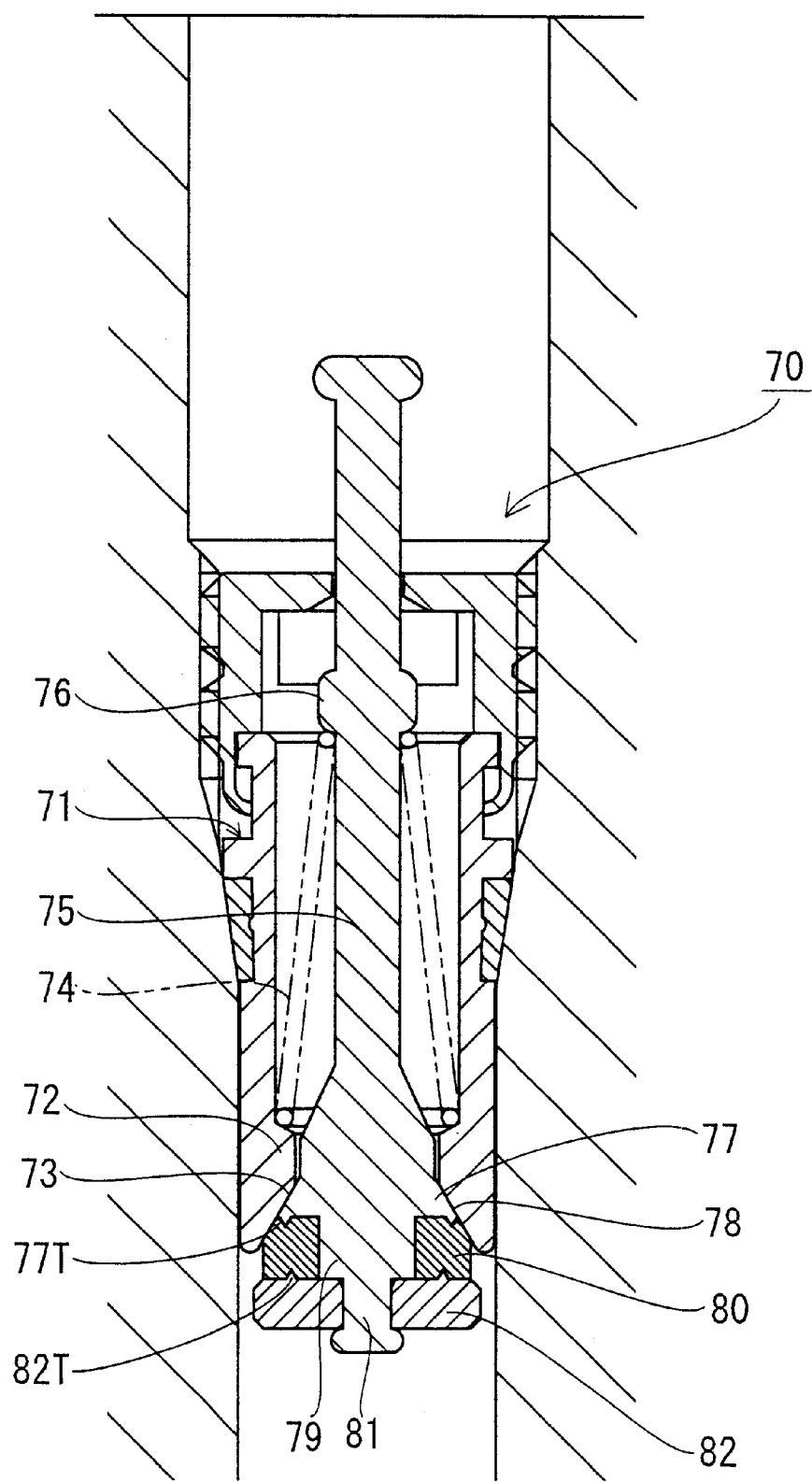
FIG. 8 is a longitudinal side section of the valve core of a third embodiment in accordance with the invention.

FIG. 8 illustrates a valve core 70 of a third embodiment. The valve core 70 includes a core body 71 having a reduced diameter portion 72 formed on an inner circumferential face at the distal end side. A portion of the core body 71 located lower than the reduced diameter portion 72 serves as an inner circumferential edge of an open end of the core body in the invention. The portion is formed with an inner inclined face 73 in the invention.

A generally conical compression coil spring 74 is provided in the interior of the core body 71. A large diameter side of the coil spring 74 is abutted against an end of the reduced diameter portion 72, whereas a reduced diameter side of the coil spring is abutted against a protrusion 76 formed on a middle portion of the shaft 75.

The first flange 77 is formed integrally on one end of the shaft 75. The first flange 77 has an outer inclined face 78 on an outer circumferential face thereof. The outer inclined face 78 corresponds to the inner inclined face 73. An annular sealing member 80 is fitted with a seal mounting portion 79 extending from the first flange 77 in the direction opposite the core body 71. Further, a disc-like second flange 82 is fitted with a reduced diameter portion 81 extending from the distal end of the seal mounting portion 79, and thereafter, the distal end of the reduced diameter portion 81 is caulked.

The sealing member 80 is formed into a generally flat cylindrical shape and has one end with an outer edge which is caused to adhere closely to the aforesaid inner inclined face 73, whereby the valve core 70 closes the core mounting hole 52. Further, the first and second flanges 77 and 82 have respective faces which are opposed to each other. Two engagement protrusions 77T and 82T are formed on these faces so as to come close to each other, respectively.

The third embodiment can achieve the same effect as the first and second embodiments. In addition, the outer inclined face 78 is formed on the outer circumferential face of the first flange 77. The outer inclined face 78 is abutted against the inner inclined face 73 formed on the core body 71 so that the flange 77 is aligned and axially positioned. The sealing member 80 adheres closely to the inner inclined face 73 after the flange 77 has been aligned and axially positioned. Consequently, the sealing performance can be improved.

The engagement protrusion 26 is formed continuously along the overall circumference of the flange 22 in the first embodiment. However, the engagement protrusion may be formed to be discontinuous, instead. Further, the engagement protrusion may be formed on the second flange 24 although it is formed on the first flange in the first embodiment.

The valve core 10 is mounted in the core mounting hole 52 formed in the nozzle 50 in the first embodiment. However, the valve core need not be assembled into a nozzle-like component. For example, the valve core may be mounted in a core mounting hole formed in a block-like member.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A valve core comprising:
   a generally cylindrical core body fixed in a core mounting hole formed in a counterpart member, the core body having an open end;
   a moving shaft extending through the core body so as to be directly driven, the shaft having an end;
   a pair of flanges provided on the end of the shaft;
   a generally annular sealing member held between the flanges so as to adhere closely to an inner circumferential edge of the open end of the core body or an inner circumferential face of the core mounting hole to thereby close the core mounting hole; and
   a pair of engagement portions formed in either flange and the sealing member so as to be brought into a concavo-convex engagement with each other to limit deformation of the sealing member causing an increase in a diameter thereof.

2. A valve core according to claim 1, wherein either one of the engagement portions is a protrusion protruding from the flange and biting into the sealing member.

3. A valve core according to claim 1, wherein the engagement portions include a protrusion formed by protruding a part of the sealing member toward one of the flanges and a depression formed by depressing a part of said one flange so as to correspond to the protrusion.

4. A valve core according to claim 2, wherein the engagement portions include a protrusion formed by protruding a part of the sealing member toward one of the flanges and a depression formed by depressing a part of said one flange so as to correspond to the protrusion.

5. A valve core according to claim 1, wherein one of the flanges located farther away from the core body than the other includes a butting portion protruding from said flange toward the sealing member, and a portion of said flange located outside the butting portion is opposed to the sealing member with a space defined therebetween.

6. A valve core according to claim 2, wherein one of the flanges located farther away from the core body than the other includes a butting portion protruding from said flange toward the sealing member, and a portion of said flange located outside the butting portion is opposed to the sealing member with a space defined therebetween.

7. A valve core according to claim 1, wherein the inner circumferential edge of the open end of the core body is formed with an inner inclined face gradually spread toward a distal end thereof, the sealing member being caused to adhere closely to the inner inclined face, and a corresponding one of the flanges has an outer circumferential face on which an outer inclined face is formed so as to abut against the inner inclined face.

8. A valve core according to claim 2, wherein the inner circumferential edge of the open end of the core body is formed with an inner inclined face gradually spread toward a distal end thereof, the sealing member being caused to adhere closely to the inner inclined face, and a corresponding one of the flanges has an outer circumferential face on which an outer inclined face is formed so as to abut against the inner inclined face.

9. A valve core according to claim 3, wherein the inner circumferential edge of the open end of the core body is formed with an inner inclined face gradually spread toward a distal end thereof, the sealing member being caused to adhere closely to the inner inclined face, and the flange has an outer circumferential face formed so as to abut against the inner inclined face.

10. A valve core according to claim 4, wherein the inner circumferential edge of the open end of the core body is formed with an inner inclined face gradually spread toward a distal end thereof, the sealing member being caused to adhere closely to the inner inclined face, and the flange has an outer circumferential face formed so as to abut against the inner inclined face.

11. A valve core according to claim 5, wherein the inner circumferential edge of the open end of the core body is formed with an inner inclined face gradually spread toward a distal end thereof, the sealing member being caused to adhere closely to the inner inclined face, and the flange has an outer circumferential face formed so as to abut against the inner inclined face.

12. A valve core according to claim 6, wherein the inner circumferential edge of the open end of the core body is formed with an inner inclined face gradually spread toward a distal end thereof, the sealing member being caused to adhere closely to the inner inclined face, and the flange has an outer circumferential face formed so as to abut against the inner inclined face.

* * * * *